United States Patent [19]

Goodhill et al.

[11] Patent Number: 5,745,213
[45] Date of Patent: Apr. 28, 1998

[54] METHOD OF MAKING ENHANCED RESOLUTION MOTION PICTURE RELEASE-PRINT FILM

[76] Inventors: Dean K. Goodhill, 8942 Wonderland Park Ave., Los Angeles, Calif. 90046; Don P. Behrns, 13229 Rose Ave., Los Angeles, Calif. 90066

[21] Appl. No.: 646,777

[22] Filed: May 8, 1996

[51] Int. Cl.$^6$ .................................................. G03B 31/02
[52] U.S. Cl. ................................................ 352/27; 352/5
[58] Field of Search ...................................... 352/1, 27, 5

[56] References Cited

U.S. PATENT DOCUMENTS

| | | | |
|---|---|---|---|
| 1,318,610 | 10/1919 | Sereinsky. | |
| 1,835,743 | 12/1931 | Aster. | |
| 1,921,494 | 8/1933 | Wildhaber. | |
| 1,999,754 | 4/1935 | Evans. | |
| 2,079,572 | 5/1937 | Kiel. | |
| 3,285,087 | 11/1966 | Wells | 74/330 |
| 3,565,521 | 2/1971 | Butler et al. | 352/180 |
| 3,819,258 | 6/1974 | Butler et al. | 352/163 |
| 3,865,738 | 2/1975 | Lente | 352/44 |
| 4,105,311 | 8/1978 | Boudouris | 352/187 |
| 4,120,572 | 10/1978 | Grallert et al. | 352/92 |
| 4,678,298 | 7/1987 | Perisic | 352/62 |
| 4,697,896 | 10/1987 | Fox | 352/180 |
| 4,893,921 | 1/1990 | Beauviala | 352/92 |
| 4,900,293 | 2/1990 | McLendon | 474/152 |
| 5,312,304 | 5/1994 | Vetter | 474/160 |
| 5,341,182 | 8/1994 | Schmidt | 352/184 |
| 5,506,639 | 4/1996 | Frazen et al. | 352/31 |
| 5,534,954 | 7/1996 | Vetter | 352/79 |
| 5,537,157 | 7/1996 | Washinto et al. | 348/722 |
| 5,537,165 | 7/1996 | Miyamori et al. | 352/27 |
| 5,539,527 | 7/1996 | Kajimoto | 358/335 |
| 5,543,869 | 8/1996 | Vetter | 352/184 |

OTHER PUBLICATIONS

"Step Printers", Optical Printers, etc. (circa 1950).
"Film Pulldown Mechanism Based on a Design by Samuel B. Grimson", *SMPTE*, vol. 67.
"The Radial–Tooth, Variable–Pitch Sprocket", *SMPTE*, vol. 57.
"Too Costly for Prime Time", *Los Angeles Times* (Mar. 22, 1992).
"Editing a Whirlwind for 'Christmas'", *Daily Variety Special Report* (Mar. 16, 1992).
"Electronic Editing with Dean Goodhill", *Editors Guild Newsletter* (Winer 1992).
"You Want a Whole Movie by When?", *Calendar* (undated).
Advertisement for New Clairmont Super 1.85 (undated).
"Three–Perf Technology: Tomorrow's Film Format—Today", *International Photographer* (Oct. 1987).

*Primary Examiner*—Safet Metjahic
*Assistant Examiner*—John Chizmar
*Attorney, Agent, or Firm*—Knobbe, Martens, Olson & Bear, LLP

[57] ABSTRACT

A method of making motion picture release-print film, such as 35 mm film. The film has an enlarged frame that occupies substantially the entire width of the film that is available for the exposure of images, and the spacing between frames is minimized. Film having these enlarged frames provides an enhanced image with a minimum of film waste. An aspect ratio of 1.85:1 in the enlarged frame size is contemplated in a three perforation format. A digital soundtrack or other appropriate soundtrack replaces the analog soundtrack that occupies a portion of the available width. The soundtrack may provide for redundancy.

12 Claims, 3 Drawing Sheets

METHOD OF MAKING ENHANCED RESOLUTION MOTION PICTURE RELEASE-PRINT FILM

BACKGROUND OF THE INVENTION

The present invention relates to motion picture film and, more particularly, a method of making motion picture release-print film that provides an enhanced projected image and lower film consumption.

With reference to FIG. 1, a conventional motion picture projector 10 uses reels 12 that supply the film 14 that goes into the projection system, and reels 16 that take up the film which has already been projected. A more recent design uses "platters" (large horizontal reels) that, on alternate ends, serve to both supply and take-up the film. Between the supply reel 12 and the take-up reel 16 lies an optical/mechanical device that actually projects the images that comprise what we call "motion pictures." This device is referred to as the projector head 18. Behind the head 18 is a lamp house 20 and a light-condenser 22, and in front of the head are lenses 24 that focus the "moving" image onto a projection screen. Below the head 18 are sound readers 26 that decode synchronized audio information which is then amplified and fed to speakers.

The term "motion pictures" is a description of an illusion—for the pictures do not actually move at all. To the contrary, the pictures (embodied in frames on the film projected at a rate of twenty-four times per-second) must be seen in as static a manner as possible in order to create the illusion of movement. The illusion is created by the gradual position differences from one film frame to the next. Between the exhibition of each of these static frames, all projected light is blocked by a rotating shutter 28 while succeeding frames are being "pulled down" into position. The viewing audience is unaware of these moments of darkness because of a perceptual phenomenon called "persistence of vision."

FIG. 1, as noted above, presents an illustration of a basic film projection system 10. In systems of this type, film is pulled off the supply reel 12, or off the supply rollers of a platter system, by a constant-speed sprocket 30. Then, a loop 32 is formed above a long metal frame called a gate 34, which exerts pressure on the edges of the film 14. This gate 34 grips the edges of the film 14 that surround the photographic image (embodied in each frame on the film) and holds them flat and straight. Through an intermittent movement mechanism, an intermittent sprocket 36 pulls the film 14 into the gate 34 and then stops it in precise registration. In this manner, the photographic image (frame) is positioned within a rectangular opening in the gate called an "aperture" placed in the optical axis between the lamp house/light-condenser 20 and 22 and the projection lens 24.

Below the gate 34, after the intermittent sprocket 36, there is another film loop 38 and a constant-speed sprocket 40. Then, on either side of the analog sound-reader 26, there are additional constant speed sprockets 42 and rollers 44 to insure smooth audio. Theatrical projectors also require sound readers. Typically, the soundtrack on a film print containing both picture and sound (a "composite" print) is placed in a continuous, linear strip on the left side of the film image.

There are no frames whatsoever on new, unexposed motion picture print film. It's entire surface is evenly coated with light-sensitive emulsion. During the process of manufacturing the projection prints, the printing stock is placed in direct contact with a film negative, and then light is shown through the two contacting strips of film. This is called a "contact print." This exposes a latent image that appears when the film is developed, and thereby creates a "frame" on the print stock.

The use of the available film surface between the rows of perforations along the edges of the film has evolved through the years—first to allow space for sound, and later to accommodate the shift to "wide-screen" presentations. However, the size and use of the film itself has been standardized since 1889 when George Eastman is reported to have accepted an order for the first strip of celluloid film which was to be 1⅜" wide (35 mm) with 64 perforations per foot. This remains the standard film size to this day. The length of the film pulled down into the aperture of the gate for each frame has also remained absolutely constant—four perforations, twenty four times per second. This translates into exactly 90 feet per minute of film moved through the projector. Consequently, standard, theatrical 35 mm film projectors are designed for so-called "four-perf pull down."

The term "aspect ratio" is used to define the ratio of the width to the height of each frame on the film. In the days of silent movies, the original full-aperture frame was used, and it had an aspect ratio of 1.33:1. When the sound era began, the layout of available projection print "real estate" was modified in order to physically make room for the soundtrack. The soundtrack is not laid down in a frame-by-frame basis since sound must be recorded and reproduced continuously, in contrast to the intermittent display used for the projection of photographic images. Thus, it was decided that the sound would be placed in a continuous strip to the left of the photographic images, which meant that these images (frames) had to be reduced in width to provide the necessary room. As a result, in order to maintain the 1.33 aspect ratio, the height of the frame also had to be reduced. This height reduction was accomplished by masking, which created a space between frames. This smaller space allotted to the projected image was called the "Academy" aspect ratio.

In the mid to late 1950s, various new theatrical projection formats (aspect ratios) appeared as a marketing response to television, which had adopted the 1.33:1 aspect ratio long used in the movies. These new projection formats started with 3-D and included the Cinerama three-panel process, which used three cameras and three projectors locked together. Cinerama produced a very wide, clear image on the screen—three times wider and three times clearer—and it was quite popular. But some audiences disliked the seams where the three images joined together on the screen. Also, it was a relatively expensive process, both in terms of production and distribution. So the hunt was on to produce a wide screen image on a single projectable print.

One solution was found with cylindrical lenses, used in conjunction with standard spherical optics, to squeeze a wide image onto a single piece of 35 mm film. These lenses precisely compress the photographic image laterally during photography and then precisely reverse that compression during projection. These so-called "anamorphic" lenses could optically squeeze a 2.35:1 aspect ratio into a 1.33:1, four-perforation frame, thus approximating the Cinerama aspect ratio. As this technology developed, these lenses were highly refined, reaching their zenith with the lenses manufactured by the Panavision Company.

These anamorphic systems are still in use to this day. However, there are still many inherent drawbacks to the anamorphic process, including limited photographic depthof-field and large, heavy camera lenses. Further, some film makers feel that the 2.35:1 aspect ratio is simply too wide. Moreover, the anamorphic process results in an image that is so wide that much of it cannot be shown on television absent significant cropping of the image or presentation of the image in what has come to be known as a "letterbox."

Soon another method was found to project a wide screen image—one that was wider than the Academy frame that had been so identified with television, but not as wide as the ones produced by the anamorphic processes. In the late 1950's, the 1.85:1 aspect ratio was developed in order to provide the audience with a "semi-wide screen look" without having to resort to anamorphic camera and projection lenses, used for true wide screen presentation. Approximately 85% of the films currently in release use the non-anamorphic 1.85:1 format. To achieve the 1.85:1 aspect ratio, a mask is simply inserted into the aperture of the projection gate. This mask covers the top and bottom areas of the projection frame, thereby increasing the width to height ratio of the picture. Consequently, the exposed images in these masked areas are never seen.

Unfortunately, the economic consequences associated with 1.85 format are considerable. The waste produced by this format accounts for 37.5% of all the space available on release prints and trailers. FIG. 2a shows film 14 having frames 46 in the 1.85:1 projection format. The cross-hatched area 48 represents the otherwise usable film area that is wasted in the 1.85:1 projection format with a frame height spanning four perforations 50 on the film 14. This format also employs an optical soundtrack on the left side of the film 14. The area represented by the reference numeral 52 corresponds to the area reserved for the optical soundtrack.

Some of the waste produced by the 1.85:1 projection format could be eliminated by changing to an alternate frame height standard that provides the same projectable area as shown in FIG. 2a, but without as much wasted picture area above and below the frame. One such alternate frame standard is the three-perforation frame shown in FIG. 2b. By eliminating some of the area previously wasted by masking, the same projectable area of the film 14 can be fitted into a space with a frame 54 that spans three perforations 56 instead of four. Consequently, elimination of this wasted area 58 results in a reduction in release print footage, and therefore cost, by 25%, even with an optical soundtrack 60. Considering the enormous quantity of release print footage that is generated annually, it is clear that very substantial savings could be achieved by switching over to three-perforation printing. A projector showing such three-perforation prints would use film at the rate of 67.5 feet-per-minute instead of the standard 90 feet-per-minute, but it could still show exactly the same size 1.85:1 frames at exactly the same 24 frames-per-second. Hence, there would be no reduction in quality whatsoever.

While the three-perforation format is a step in the right direction, it is not the ultimate in film conservation, since there is still some wasted area at the top and bottom that must be masked during projection. FIG. 2c illustrates another alternate frame height for the 1.85:1 format in which there is even less wasted film area 62 on the film 14. The standard 1.85:1 format has an established picture width that is limited by the space reserved on the left side of the film for the optical soundtrack 64. This limiting width for the frame 66, together with the 1.85:1 aspect ratio, establishes the minimum frame height of 0.446 inches. When a few thousandths of an inch are added for space between frames 66, this height corresponds to precisely 2.5 perforations 68 of film length. The 2.5-perforation pull down format represents a saving of about 37.5% when compared to the standard four-perforation format and is currently being proposed as an alternate industry release-print standard.

Although both the three-perforation format and the 2.5-perforation format help reduce film waste, neither one provides any enhancement in the quality or resolution of the projected image. This is because both formats simply rely on placing the standard 1.85:1 format frame into three or 2.5 perforations instead of the usual four perforations. In addition, both formats utilize optical soundtracks that occupy space on the left side of the film.

The nature of the images exhibited in theatrical motion picture theaters has changed a great deal since the four-perforation projection pull-down was standardized in 1889. However, the basic specification of the projection pull down has failed to evolve in response to these changes. The amount of film pulled into the projector's intermittent movement has remained constant: four perforations per frame. In order to understand the significance of the innovation disclosed herein, it must be understood that retaining the four-perforation projection movement, when used with the popular 1.85:1 format, wastes significant amounts of film (25% to 37.5%), without any enhancement in the quality of the projected image. The three-perforation format has never been widely accepted, and the 2.5-perforation format has only recently been suggested.

Accordingly, there has existed a definite need for a new method of exhibiting motion picture film that avoids film waste and that provides a projected image having enhanced quality and resolution as compared to the prior film formats. The present invention satisfies these needs and provides further related advantages.

SUMMARY OF THE INVENTION

The present invention provides a method of making motion picture release-print film that has an enhanced projected image with a minimum of film waste. The film has an enhanced projected image due to an increased frame size relative to prior film formats, while, at the same time, in one embodiment, significantly reducing the cost of production and distribution by reducing the quantity of film required for each print. Thus, at least one embodiment of the invention reconciles two conflicting parameters in film making—enhancing the projected film image and minimizing film waste. Both embodiments significantly increase the clarity and resolution of the projected image.

In accordance with the invention, the width of each film frame is expanded to fill the space defined by the distance between the perforations along the edges of the film, within specified limits. The soundtrack normally occupying a portion of this space is eliminated and replaced with other soundtrack means that do not occupy the space between the perforations available for the projected image. At the same time, the height of the film frame is expanded as much as possible to minimize the spacing between the frames.

In one embodiment, the 1.85:1 aspect ratio is maintained in a three perforation format, but with a significantly enlarged frame size. The width of each frame is expanded such that it occupies substantially all of the space between the perforations that is available for the projected image. The height of the frame is then increased until the width-to-height (aspect) ratio of the frame equals 1.85:1. The result is a significantly enlarged frame that provides an enhanced projected image, due to the enlarged size of the frame, as compared to the prior art 1.85:1 projection formats having a smaller frame size. Yet, the frame only occupies slightly less than three perforations of film height. Consequently, the film can be exhibited at a rate of 67.5 feet-per-minute, at 24 frames-per-second. Importantly, film waste is minimized, while the enhancement of the projected image is maximized. Moreover, since the 1.85:1 aspect ratio is maintained, all of the advantages attendant to that aspect ratio, which is the predominant projection format in the United States and Canada, are maintained.

In another embodiment, an aspect ratio of 2.0:1 has been established in a four perforation format. As in the first embodiment, a significantly enlarged frame size is provided to yield an enhanced projected image. In this second embodiment, the height of the frame is expanded until the frame-to-frame spacing is reduced to substantially zero, with each frame spanning exactly four perforations. The width of the frame is then increased as much as possible until it substantially occupies all of the space between the perforations that is available for the projected image. An anamorphic process can be used to laterally "squeeze" the projected imaged to fit the available space between the perforations, to yield a width-to-height (aspect) ratio of 2.0:1. Again, the result is a frame with an enhanced projected image due to the increase in the size of the frame. Although the frame occupies four perforations, the enhancement in the projected image is substantial and significant. Moreover, there is virtually no wasted space between frames and, thus, substantially all of the film emulsion area available for a photographic image is used. Once again, film waste is minimized, while the enhancement of the projected image is maximized. Furthermore, since the majority of film projection systems for theatrical film exhibition operate at 90 feet-per-minute, 24 frames per second, the new 2.0:1 projection format provided by the present invention is adapted for use with these projection systems, with some slight modifications, as will be described in more detail below.

Hence, in both of the formats disclosed herein, the end result of the increase in image area is an improvement in the clarity of the image projected on the large screen, with minimum film waste. In addition, in the second embodiment, an aspect ratio of 2.0:1 has been established to be proposed as an alternate release print format which conveniently corresponds to the proposed broadcast format for the future High Definition TV.

Further features and advantages of the present invention will become apparent from the following detailed description, taken in conjunction with the accompanying drawings, which illustrate, by way of example, the principles of the invention.

DESCRIPTION OF THE PREFERRED EMBODIMENTS

Figure 3:
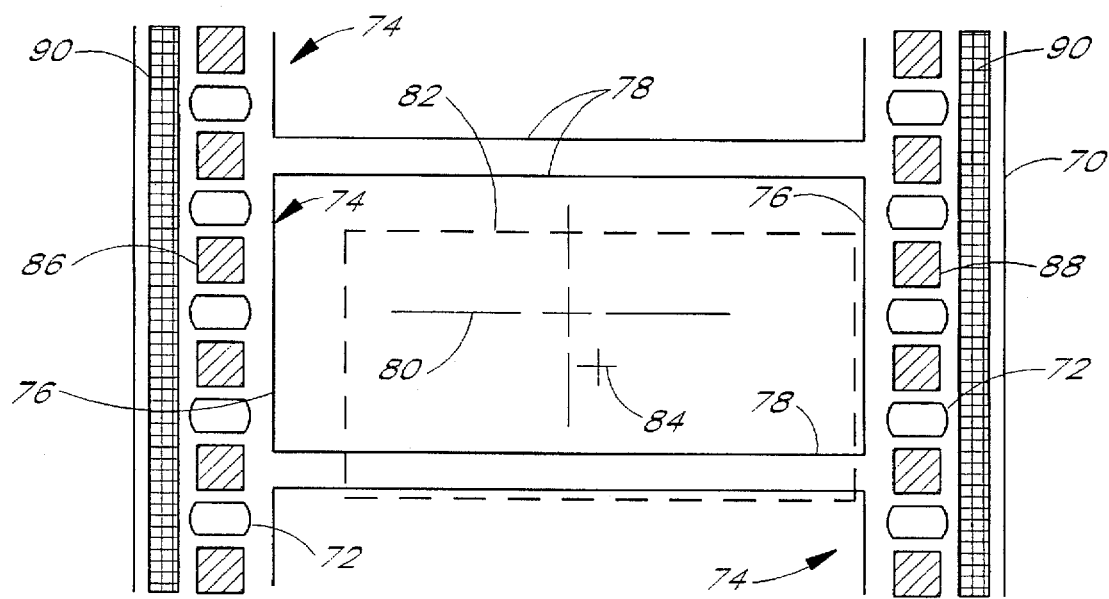
FIG. 3 is a section of film in a novel layout, embodying the features of the present invention, having an enlarged frame for an enhanced projected image, with an aspect ratio of 1.85:1 in a three perforation format.

The first embodiment of the present invention, which is referred to as "MaxiVision," is shown in FIG. 3. It comprises a strip of 35 mm motion picture film 70 having its entire surface coated with a light sensitive emulsion. Two rows of perforations 72 extend along opposite edges of the film for engagement with the sprockets of a film projection system. Images are exposed onto the film, with the images being defined by a series of frames 74 having a significantly enlarged size.

Figure 1:
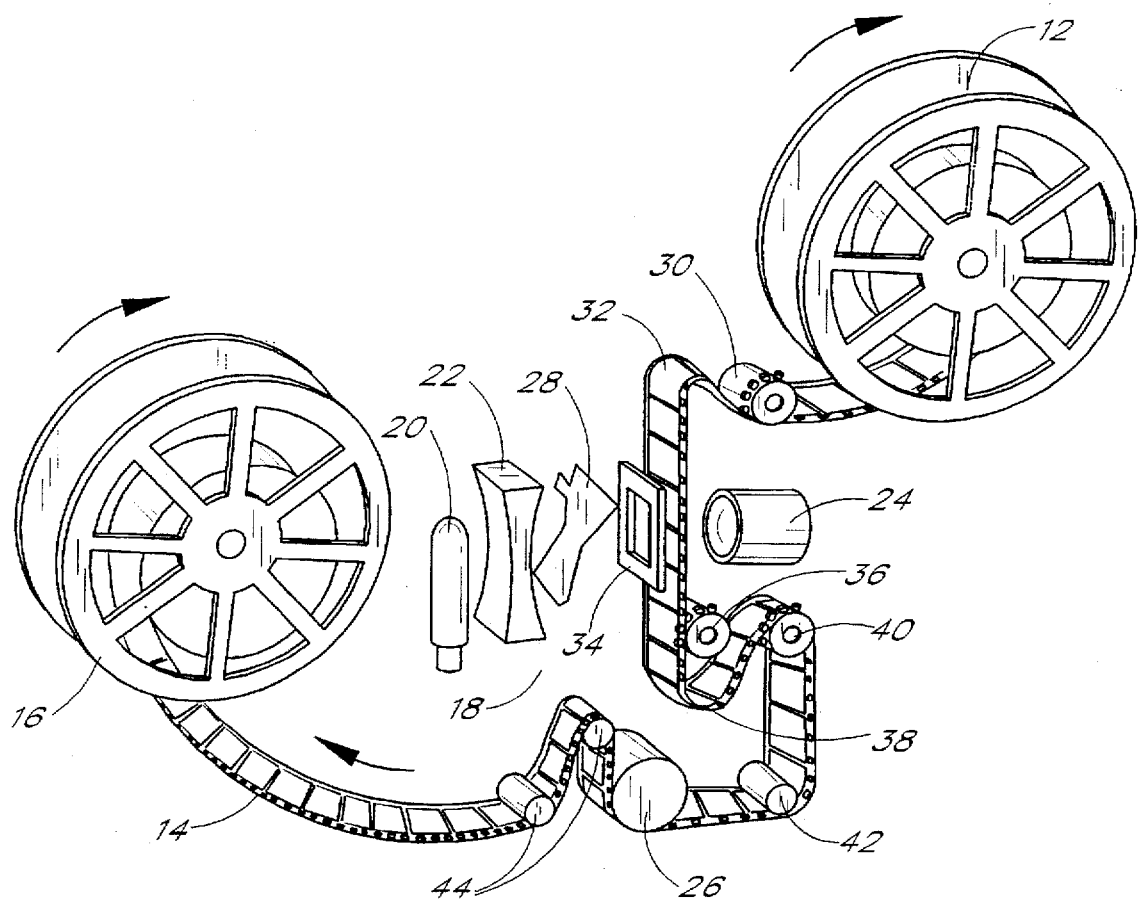
FIG. 1 is an illustration of a basic film projection system of the prior art.
Figure 2A:
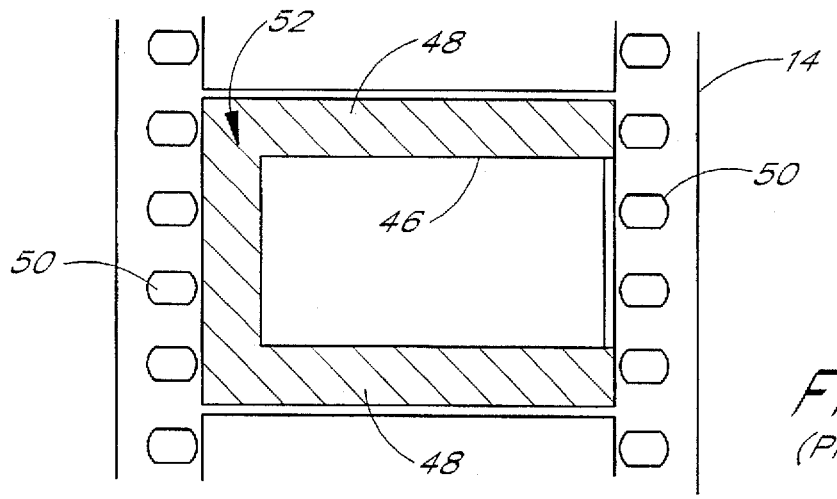
FIG. 2a is a section of film in a conventional layout of the prior art, having an aspect ratio of 1.85:1 in a four perforation format.
Figure 2B:
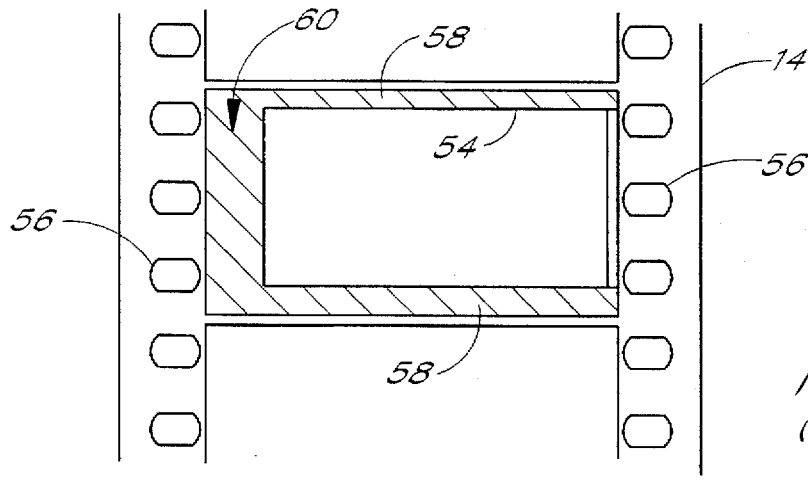
FIG. 2b is a section of film in another conventional layout of the prior art, having an aspect ratio of 1.85:1 in a three perforation format.
Figure 2C:
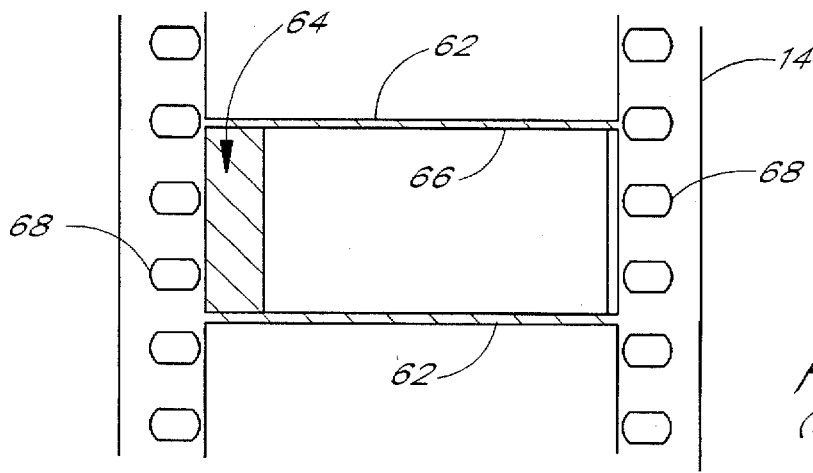
FIG. 2c is a section of film in yet another conventional layout of the prior art, having an aspect ratio of 1.85:1 in a 2.5 perforation format.

In accordance with the invention, the height 76 of each frame 74 spans three perforations 72. This eliminates the wasted area between frames that currently exists in the 1.85:1/four-perforation projection format, as previously described in conjunction with FIG. 2a. As a result, the print film consumption and processing costs for MaxiVision are reduced by 25%, without sacrificing image size in any way. Furthermore, an increase in projectable image size is achieved by allowing the permissible image exposure area to extend, in frame width 78, to the full distance between the rows of perforations 72 (within specified limits) and, in height 76, from frame-line to frame-line, while maintaining a 1.85:1 aspect ratio.

A practical limit on the width of a frame has been essentially established by camera manufacturers, such as Panavision and Arriflex. The limit is 0.945 inches, and this establishes the controlling width dimension 78 for the enlarged image of the present invention. By using the established aspect ratio of 1.85:1 and a frame width 78 of 0.945 inches, the corresponding image height 76 of the frame 74 is 0.51 inches. This allocation of space for each frame 74 is illustrated in FIG. 3. Since the longitudinal spacing between each perforation 72 is 0.187 inches, there is a spacing between frames of only about 0.05 inches in this embodiment. The reference numeral 80 corresponds to the optical axis of the MaxiVision frame 74. For purposes of reference, the prior art frame 82 and its optical axis 84, in the 1.85:1 aspect ratio, are shown in dashed lines.

The MaxiVision format eliminates the analog optical soundtrack printed on the prior art release prints. In its place, the frame is expanded to the full 0.945 inches width. The end result of this reallocation of the available film exposure area is a 31.2% increase in projectable image area. This directly relates to an enhanced picture resolution by 31.2%, and a reduction in film consumption and processing costs by 25%.

Since the space on the film formerly set aside for the analog soundtrack is now being occupied by the enlarged frame 74, a different soundtrack is provided for the MaxiVision film. As explained below, the MaxiVision film 70 will eliminate the analog soundtrack entirely and replace it with redundant digital tracks or other appropriate soundtrack means.

In one form of the invention, the primary soundtrack will comprise a control track 86 located between the perforations 72 on either or both edges of the film 70. This control track 86 contains no audio information but, rather, generates a signal to be delivered, for example, to a CD ROM player. This signal enables the audio track to be played back in synchronization with the picture from a CD ROM recording. Such a system already exists (DTS), but it is not necessarily the system that will be employed in the MaxiVision film. One major advantage of using a control track-based system is the universality of the prints. For example, one standard print can be circulated worldwide by merely changing the accompanying CD ROM to the appropriate language version.

As a backup, the MaxiVision film may contain a redundant digital control track 88 which could control a separate but identical CD ROM system, with the redundant control track 88 located between the perforations 72 on the opposite side of the film 70. Alternately, the backup system could be a continuous digital track 90 running along the shoulder of the film 70 (which also may be redundant). One disadvantage of the latter approach, however, is that the backup dialogue is an integral part of the print and, therefore, the universality is somewhat diminished.

The MaxiVision film prints 70 can be manufactured using conventional contact printing processes, in which the picture is exposed on the print stock in a continuous contact film printing process. Both control track and digital audio are exposed in a separate operation. The film is subsequently developed to yield a composite (picture and sound) release print. In one embodiment, the printing negative that is used to expose the MaxiVision prints 70 can be derived directly from an interpositive print, which in turn is made by contact printing from the camera negative. This embodiment requires the use of a special camera that has been modified for three-perforation pull down and full aperture exposure. A special view finder ground glass is provided to enable the exposure of the additional negative area, and the lens mount must be shifted slightly to match the optical axis of the enlarged aperture. Cameras of this type area available from both Panavision and Arriflex, and it will be apparent to those skilled in the art how to modify the camera in the manner described above.

Alternatively, the printing negative may be derived by contact printing from a three-perforation interpositive that is a conversion print from a conventional four-perforation camera negative. In this case, the camera that is employed is a conventional movement, such as from a four-perforation camera negative to three-perforation interpositive which can be accomplished through the use of the Asynchronous Contact Printer for Motion Picture Film disclosed in application Ser. No. 08/624,702 filed on Mar. 26, 1996, which is incorporated herein by reference. This asynchronous contact printer has been designed specifically for this type of application. The printer is capable of making contact quality prints by converting four-perforation format film to three-perforation format film, or vice versa.

Theatrical projection of the MaxiVision release prints 70 will require a special projection system capable of three-perforation pull down. Such a system is provided by the Switchable Pulldown Film Projection System disclosed in application Ser. No. 08/598,033 filed on Feb. 7, 1996, which is incorporated herein by reference. In addition, these projection systems must be capable of moving the projected image slightly to the right to compensate for the slight shift in the optical axis of the enlarged aperture, as previously described.

Figure 4:
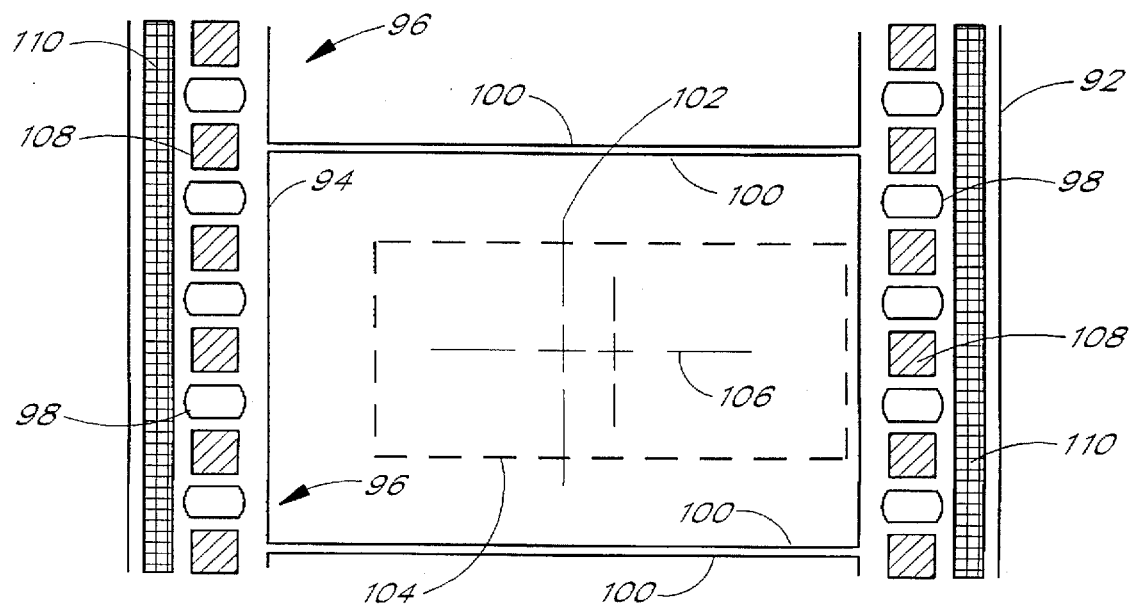
FIG. 4 is a section of film in another novel layout, also having an enlarged frame for an enhanced projected image, with an aspect ratio of 2.0:1 in a four perforation format.

Another embodiment of the present invention, referred to as "Super MaxiVision," is shown in FIG. 4. The Super MaxiVision film 92 described below creates a presentation format which could establish a new theatrical projection format, while at the same time conform to the highly favored aspect ratio for High Definition TV as recommended by the American Society of Cinematographers and numerous other organizations.

The aspect ratio of the Super MaxiVision format film 92 would be 2.0:1 and would be achieved through the use of lateral anamorphic compression and expansion techniques. The height 94 of each frame 96 is expanded such that it spans exactly four perforations 98, with virtually no spacing between the frames. This is a distance of 0.748 inches (because the distance between each perforation 98 is 0.187 inches). Next, applying the desired aspect ratio of 2.0:1 an uncompressed frame width 100 of 1.496 inches is achieved. Since the maximum allowable "full aperture" frame width 100 on the film is 0.945 inches, the compression ratio of the anamorphic camera lens must be 0.945/1.496, or 0.632. Conversely, the expansion ratio of the anamorphic projection lens would be the inverse of this, or 1.582. The reference numeral 102 corresponds to the optical axis of the Super MaxiVision frame 96. For purposes of reference, the prior art frame 104 and its optical axis 106, in a 1.85:1 aspect ratio, are shown in dashed lines.

In order to make use of the "full aperture" film width 100 described above, it is necessary to eliminate the conventional analog soundtrack and replace it with a redundant digital control tracks 108, redundant continuous digital tracks 110, or other appropriate soundtrack control means. The options available in this respect are the same as those presented above for the MaxiVision embodiment of this invention. Printing of release prints would be achieved through the conventional contact printing process, also previously discussed. The projection of Super MaxiVision prints 92 would require a projector equipped with the proper anamorphic lens, and with the capability of shifting the screen image and the optical axis of the lens. However, as discussed for the MaxiVision embodiment, this projection technology is readily available.

From the foregoing, it will be apparent that the present invention provides a method of making motion picture release-print film having an enhanced projected image with a minimum of film waste. Not only is the quality of the projected image and its resolution significantly improved over the prior art film formats, and in the case of MaxiVision, the cost of producing and distributing the release prints is substantially reduced. Thus, the present invention reconciles two conflicting parameters in film making—providing an enhanced projected image and minimizing film waste—in a manner that has never before been achieved.

While a particular form of the invention has been illustrated and described, it will be appreciated that various modifications can be made without departing from the spirit and scope of the invention. Accordingly, it is not intended that the invention be limited, except as by the appended claims.

We claim:

1. A method of making enhanced resolution motion picture release-print film, comprising:

providing a strip of motion picture film with a light-sensitive emulsion, wherein the film has two rows of perforations extending along opposite edges of the film for engagement with sprockets of a motion picture film projector;

exposing images onto an area of the film, wherein the area occupied by each image is defined by a frame having a width of at least approximately 0.88 inches that substantially occupies the available space between the rows of perforations, including space ordinarily occupied by a conventional analog soundtrack, and having a height that spans approximately three perforations or less, providing a printed aspect ratio of substantially 1.85:1; and placing audio information on the film, other than a conventional analog soundtrack, that coordinates sound with the images when projected by the motion picture film projector.

2. Motion picture release-print film having enhanced resolution, comprising:

a strip of motion picture film having two rows of perforations extending along opposite edges of the film for engagement with sprockets of a motion picture film projector;

a plurality of projectable images on an area of the film, wherein the area occupied by each image is defined by a frame having a width of at least approximately 0.88 inches that substantially occupies the available space between the rows of perforations, including space ordinarily occupies by a conventional analog soundtrack, and having a height that spans approximately three perforations or less, providing an aspect ratio of substantially 1.85:1; and audio information on the strip, other than a conventional analog soundtrack, that coordinates sound with the images when projected by the motion picture film projector.

3. The motion picture film of claim 2, wherein the audio information comprises a digital soundtrack, including a control track placed on the film outside the frames that controls operation of a CD ROM player to produce audio in synchronization with the images on the film.

4. The motion picture film of claim 3, wherein the digital soundtrack is redundant to provide redundant digital audio.

5. The motion picture film of claim 4, wherein one control track is placed on the film between the perforations along one edge of the film, and another redundant control track is placed on the film between the perforations along the opposite edge of the film.

6. The motion picture film of claim 2, wherein the width of each frame is approximately 0.945 inches and the height of each frame is approximately 0.51 inches.

7. The motion picture film of claim 2, wherein the spacing between frames is approximately 0.05 inches.

8. The motion picture film of claim 6, wherein the resolution of each image is enhanced by more than about 30 percent as compared to images defined by frames having a standard 1.85:1 aspect ratio with a frame width of approximately 0.825 inches and a frame height of approximately 0.446 inches.

9. A method of making enhanced resolution motion picture release-print film, comprising:

providing a strip of motion picture film with a light-sensitive emulsion, wherein the film has two rows of perforations extending along opposite edges of the film for engagement with sprockets of a motion picture film projector;

exposing images onto an area of the film, wherein the area occupied by each image is defined by a frame having a width of approximately 0.945 inches and a height of approximately 0.51 inches, whereby the width of the frame occupies substantially the entire available space between the rows of perforations, including space ordinarily occupied by a conventional analog soundtrack, and the height of the frame spans approximately three perforations, providing a printed aspect ratio of substantially 1.85:1; and placing audio information on the film that coordinates sound with the images when projected by the motion picture film projector, wherein the audio information substantially does not occupy said available space between the rows of perforations.

10. Motion picture release-print film having enhanced resolution, comprising:

a strip of motion picture film having two rows of perforations extending along opposite edges of the film for engagement with sprockets of a motion picture film projector;

a plurality of projectable images on an area of the film, wherein the area occupied by each image is defined by a frame having a width of approximately 0.945 inches and a height of approximately 0.51 inches, providing an aspect ratio of substantially 1.85:1; and audio information on the strip that coordinates sound with the images when projected by the motion picture film projector, wherein the audio information substantially does not occupy said available space between the rows of perforations.

11. A method of making enhanced resolution motion picture release-print film, comprising:

providing a strip of motion picture film with a light-sensitive emulsion, wherein the film has two rows of perforations extending along opposite edges of the film for engagement with sprockets of a motion picture film projector;

exposing images onto an area of the film, wherein the area occupied by each image is defined by a frame having a width of at least approximately 0.9 inches and which substantially occupies space between the rows of perforations, including space ordinarily occupied by a conventional analog soundtrack, and a height that spans approximately three perforations or less, providing an aspect ratio of substantially 1.85:1; and placing audio information on the film, other than a conventional analog soundtrack, that coordinates sound with the images when projected by the motion picture film projector.

12. Motion picture release-print film enhanced resolution, comprising:

a strip of motion picture film having two rows of perforations extending along opposite edges of the film for engagement with sprockets of a motion picture film projector;

a plurality of projectable images on an area of the film, wherein the area occupied by each picture is defined by a frame having a width of at least approximately 0.9 inches and which substantially occupies space between the rows of perforations, including space ordinarily occupied by a conventional analog soundtrack, and a height that spans approximately three perforations or less, providing an aspect ratio of substantially 1.85:1; and audio information on the strip, other than a conventional analog soundtrack, that coordinates sound with the images when projected by the motion picture film projector.

* * * * *